United States Patent
Garvin

(10) Patent No.: US 7,812,255 B2
(45) Date of Patent: Oct. 12, 2010

(54) ELECTRICAL JUNCTION BOX WITH FASTENER KNOCKOUT FEATURE AND METHOD

(76) Inventor: Barton L. Garvin, 3700 Sandra St., Franklin Park, IL (US) 60131

(*) Notice: Subject to any disclaimer, the term of this patent is extended or adjusted under 35 U.S.C. 154(b) by 197 days.

(21) Appl. No.: 12/157,424

(22) Filed: Jun. 10, 2008

(65) Prior Publication Data

US 2009/0301776 A1   Dec. 10, 2009

(51) Int. Cl.
*H02G 3/08* (2006.01)
(52) U.S. Cl. .................... 174/50; 174/58; 174/63; 174/64; 174/666; 248/906; 439/535
(58) Field of Classification Search .............. 174/50, 174/58, 63, 64, 666; 220/3.3, 3.5, 3.9; 439/535; 248/906
See application file for complete search history.

(56) References Cited

U.S. PATENT DOCUMENTS

| | | |
|---|---|---|
| 599,498 A | 2/1898 | Close |
| 858,700 A | 7/1907 | Bossert |
| 946,646 A | 1/1910 | Pratt |
| 1,271,216 A | 7/1918 | Platt |
| 2,092,367 A | 9/1937 | Breitenstein |
| 2,324,155 A | 7/1943 | Haynes |
| 2,495,584 A | 1/1950 | Hook |
| 2,987,909 A | 6/1961 | Shank |
| 3,137,763 A | 6/1964 | Jones |
| 3,252,611 A | 5/1966 | Weitzman et al. |
| 3,349,946 A | 10/1967 | Lee |
| 3,369,071 A | 2/1968 | Tuisku |
| 3,392,228 A | 7/1968 | Zerwes |
| 3,965,287 A | 6/1976 | Mueller |
| 3,987,928 A | 10/1976 | Mori |
| 4,051,322 A | 9/1977 | Park et al. |
| 4,058,358 A | 11/1977 | Carlisle |
| 4,163,137 A | 7/1979 | Close, Jr. |
| 4,223,796 A | 9/1980 | Silver |
| 4,244,483 A | 1/1981 | Bauer et al. |
| 4,277,641 A | 7/1981 | Bauer et al. |
| 4,316,999 A | 2/1982 | Nattel |
| 4,331,832 A | 5/1982 | Curtis et al. |
| 4,408,695 A | 10/1983 | Balkwill et al. |
| 4,455,449 A | 6/1984 | Rendel |
| 4,484,021 A | 11/1984 | Schaefer |
| 4,715,507 A | 12/1987 | Chamberlin |
| 4,825,339 A | 4/1989 | Boudon et al. |
| 4,874,904 A | 10/1989 | De Santi |

(Continued)

*Primary Examiner*—Dhiru R Patel
(74) *Attorney, Agent, or Firm*—Meroni & Meroni, P.C.; Charles F. Meroni, Jr.; Christopher J. Scott

(57) ABSTRACT

A Chicago-style plenum-type electrical junction box provides an air impermeable barrier between a box support structure and a junction enclosure. The junction box includes a base plate and a peripheral wall, the peripheral wall extending from the base plate such that the base plate and peripheral wall define the junction enclosure. The base plate preferably includes a series of fastener knockouts so as to provide an air impermeable barrier. The fastener knockouts are selectively removable for exposing a series of fastener-receiving apertures. The fastener-receiving apertures receive a series of fasteners for sealing the fastener-receiving apertures when fastening the junction box to the box support structure thereby providing an air tight barrier between the box support structure and the junction enclosure.

18 Claims, 3 Drawing Sheets

U.S. PATENT DOCUMENTS

| | | | |
|---|---|---|---|
| 5,004,115 A * | 4/1991 | L'Heureux | 220/3.3 |
| 5,066,832 A | 11/1991 | Clarey et al. | |
| 5,191,171 A | 3/1993 | Bordwell | |
| 5,272,279 A | 12/1993 | Filshie | |
| 5,600,091 A | 2/1997 | Rose | |
| 5,693,909 A | 12/1997 | McEwen | |
| 5,698,820 A | 12/1997 | Collard | |
| 5,728,973 A * | 3/1998 | Jorgensen | 174/666 |
| 5,883,332 A | 3/1999 | Collard | |
| 5,997,616 A | 12/1999 | Ledru et al. | |
| 6,069,317 A | 5/2000 | Wagganer | |
| 6,179,634 B1 | 1/2001 | Hull et al. | |
| 6,232,553 B1 | 5/2001 | Regen | |
| 6,233,160 B1 | 5/2001 | Shockley | |
| 6,293,697 B1 | 9/2001 | Gul | |
| 6,563,047 B2 | 5/2003 | Lambiaso | |
| 6,624,990 B1 | 9/2003 | Lortscher | |
| 6,669,506 B2 | 12/2003 | Newton | |
| 6,727,429 B1 | 4/2004 | Koessler | |
| 6,831,222 B2 | 12/2004 | Pastuch | |
| 6,953,890 B2 | 10/2005 | Koessler | |

* cited by examiner

ELECTRICAL JUNCTION BOX WITH FASTENER KNOCKOUT FEATURE AND METHOD

PRIOR HISTORY

This application claims the benefit of U.S. Design patent application Ser. No. 29/269,026, filed in the United States Patent and Trademark Office on Nov. 17, 2006.

BACKGROUND OF THE INVENTION

1. Field of the Invention

The disclosed invention generally relates to an electrical junction box or outlet box construction. More particularly, the disclosed invention relates to a so-called Chicago style plenum type electrical junction box, which boxes provide air impermeable barriers for routing conductors, and which box according to the present invention provides air impermeable fastener knockouts for easing installation.

2. Description of the Prior Art

The prior art discloses a variety of outlet boxes or electrical junction boxes and the like. Some of the more pertinent prior art relating to junction boxes are described hereinafter. U.S. Pat. No. 2,092,367 ('367 Patent), which issued to Breitenstein, for example, discloses an Outlet Box. The '367 Patent describes an outlet box made of any suitable metal, such as steel, and comprises a horizontal wall or base and integral side and end walls. The base and walls may be provided with a plurality of knock-outs for the reception of conduits, cables or conductors leading to the interior of the box. The outlet box may also be provided with openings for fastening the box to the rafters, studs, or other supporting members and for securing the barrier wall in position. The side and end walls may be provided with inturned tongues or flanges for the reception of threaded fastening means for fastening a cover plate to the open face of the box. The cover plate is made in variable depths or thicknesses determinable upon the type of construction with which the box is used.

U.S. Pat. No. 2,324,155 ('155 Patent) which issued to Haynes, discloses an Outlet Box. The '155 Patent describes an outlet box, made of any preferred material, and comprises as constituent portions, a disk-like head having ventilating openings and a rim connected to the head and supplied with any suitable attaching means. Disks results from the formation of holes in the head of the box, the constituent material of which is extruded slightly to form oppositely disposed, integral, peripheral lips and oppositely disposed integral, peripheral wings extended between the lips and of the greater area than the lips.

U.S. Pat. No. 2,659,765 ('765 Patent), which issued to Dunn, discloses an Electrical Splice Box. The '765 Patent describes a junction box for electrical circuits, substantially octagonal in shape. It is provided with a plurality of plugs in that these plugs are severed through substantially the entire circumference with the exception of a small tongue or fin. The plugs are embossed, so as to be located substantially entirely within the box. These knock-out plugs are similar to the knock-out plugs now used in conventional Junction and outlet boxes. The periphery of the box is provided with a pair of inwardly directed lugs or tabs having threaded apertures adapted to receive retaining screws threadedly engaging the apertures adapted to receive retaining screws threadably engaging the apertures used in holding a metal plate forming a cover for the junction box. The structure described thus far is conventional, with the exception of a portion of the box.

U.S. Pat. No. 3,349,946 ('946 Patent), which issued to Lee, discloses an Electric Outlet Box. The '946 Patent describes an electric outlet box in which the walls and bottom of the box are provided with one or more circular score lines defining knock-out discs. Each circular score line has spaced apart recesses in the disc portion to provide tongues that extend inwardly into the interior of the box. An anchor sleeve has a cylindrical portion of the same diameter as the circular score line and is provided with longitudinally extending grooves in this portion that receive the tongues. The grooves extend into an integral head of the anchor sleeve and prevent the head from rotating when the tongues are received therein.

U.S. Pat. No. 3,965,287 ('287 Patent), which issued to Mueller, discloses certain Electric Circuit Enclosure Transformer Mounting Means. The '287 Patent describes a mounting plate adapted to mount a transformer on an electric circuit enclosure. The mounting plate is provided with a dual function knockout arrangement so that the transformer to be mounted can either be surface mounted with different types of mounting means, or can be recessed into the plate by the removal of the entire knockout portion.

U.S. Pat. No. 4,051,322 ('322 Patent), which issued to Park et al., discloses an Electrical Junction Box. The '322 Patent describes an electrical junction box comprising a base and a four-sided peripheral wall with a pair of opposite tubular connectors protruding outwardly from opposite end walls and providing ingress through respective walls, into the box. The box is split into two complementary parts along a line passing through the base and the opposite end walls including the connectors. The base is hinged so that the complementary parts may pivot relative to each other from their normal position of abutment to each other to open the connectors so that conductors within a sheathed cable can be passed through the box from the connectors after severing the surrounding sheath but without severing the cable conductors, and the severed ends of the sheath can be connected to the protruding connectors. This permits making electrical connections to the conductors within the box without severing the conductors. This also provides access to the inside of the sheath to fish additional circuits into the junction box.

It will be observed that the split connectors are attached to the end walls and project from them. The end wall parts are shaped to pass the conductors received by the connectors. In the illustrated embodiment they do this by receiving the connector parts themselves, the base flanges being mounted on the inside of the end wall parts. Nails may be driven through the holes in the based of the box to hold the box closed and also to mount it to a base such as a joist or girder. This nailing operation will be done after the conductors are placed in the opened tubes, and will be enclosed in the tubes when the box is closed as shown.

U.S. Pat. No. 4,244,483 ('483 Patent) which issued to Bauer et al. discloses an Electrical Wiring Box. The '483 Patent describes a molded plastic electrical wiring box having knock-out regions comprising a two-flap structure with the flaps having essentially planar offset surfaces providing a frangible bridge or web to separate the flaps.

U.S. Pat. No. 4,316,999 ('999 Patent), which issued to Nattel, discloses an Electrical Wiring Box and Cable Clamp. The '999 Patent describes an electrical wiring box comprising a wiring box with end, side, and rear walls and a cable clamp. The wiring box wall structure is provided with knock-out regions, a first cable-engaging means, and means for attaching the cable clamp to a wall having knock-out regions. The cable clamp comprises a flexible flat sheet, attachable at one end to the box wall structure interior to the box. The opposite end of the cable clamp is provided with a foot portion, formed at an acute dihedral angle with the main body of the clamp. A non-metallic sheathed electrical cable inserted through a knock-out opening in the box wall structure, deflects the unattached end of the clamp inwardly into the box, engaging the cable against removal from the knock-out opening in an outward direction by the action of the first cable-engaging means and the heel of the clamp foot portion bearing oppositely against the cable sheath.

U.S. Pat. No. 4,455,449 ('449 Patent), which issued to Rendel, discloses a Universal High/Low Voltage Kit for Junction Wiring Box. The '449 Patent describes a kit which is installable in a wiring junction box so as to adapt the box to receive high and low voltage wiring from high and low voltage sources and high and low voltage wiring from an appliance, and to permit the connection of the high and low voltage connections within the box being physically separated from one another. The kit comprises a partition installable within the box so as to divide the interior of the box into a high voltage compartment and a low voltage compartment. A cover is provided for closing the open front face of the box, this cover including a first cover plate securable to the box to overlie only a portion of the box bottom. The cover assembly further includes a second cover plate removably installable on the box after the wiring connections have been made within the box thereby to permit inspection of the wiring connections without disturbing the wiring within the box.

U.S. Pat. No. 4,825,339 ('339 Patent), which issued to Boudon et al., discloses a Sheet Metal Knock-Out. The '339 Patent describes a knock-out in the wall of the housing for electronic equipment which is selectively removed to provide a knock-out opening. A wall includes first and second slits positioned along the boundary of the knock-out and separated by a land. The wall includes a break out opening adjacent to each land. Break portions of the wall separate the break out opening from the first and second slits. These break portions are severed to interconnect the first and second slits through the break out opening and permit removal of the knock-out. Plural such slits and break out openings are provided and arranged to provide a knock out of rectangular or other desired geometric shape. The slits and break out openings are sized to provide electromagnetic interference shielding. Also, the break portions are of a length which is approximately no greater than the thickness of the wall and are positioned to facilitate removal of the knock-out without deforming the wall and without leaving burrs in the knock-out opening.

U.S. Pat. No. 5,698,820 ('820 Patent), and U.S. Pat. No. 5,883,332 ('332 Patent), which issued to Collard, disclose Method(s) and Apparatus(es) for Junction Box and Conduit Support. The noted patents describe a flat plate to which an electrical junction box is centrally mounted with the plate extending beyond the sides of the junction box and conduits entering the junction box are supported by conduit clamps attached to the extended portions of the plate. Slots are provided in the extended portions of the flat plate to permit alignment of the conduit clamps with the entering conduit. These disclosures are illustrate standardized fastener hole arrangements.

It may be seen from a consideration of the foregoing that the prior art appears to be silent on a junction box having fastener knockouts for enabling easy removal of knockout structure for creating fastener-receiving apertures and maintaining an otherwise air impermeable barrier. Accordingly, the prior art perceives a need for such a junction box, as described in more detail hereinafter.

It may be seen from a consideration of the general state of the art that standard electrical conduit boxes have trade size knockouts that are cut into the steel side and bottom walls and pushed out being secured to the box body by only a small tab that connects the knockout to the box. Typically, there is a ⅛"-¼" gap around all knockouts in a standard electrical conduit box. In addition to the conduit knockouts in the side and bottom of the standard electrical conduit box, the conduit box may also have fastener-receiving holes in the side and bottom of the box so the installer can insert a screw or nail through the box hole and mount it to a wood, concrete or steel surface.

So-called Chicago plenum air tight electrical boxes are similar to the standard version electrical conduit box, but the knockouts must be re-hit with the surface body of the box to create an air tight seal. It is also imperative that there are no various sized holes in this box or it would lose its air tight seal. It cannot contain any holes or gaps that are common in standard electrical conduit boxes. Chicago Plenum boxes have been made without mounting holes for more than 50 years by at least 4 different manufacturers. This is a huge inconvenience to the installer because they are forced to take out a power drill and drill mounting holes where they need them. This is very time consuming, power consuming, and costly to the installer.

SUMMARY OF THE INVENTION

The present invention provides a Chicago style plenum electrical box with air tight fastener hole-covering slugs or knockouts that are re-hit with the steel surface of the box to create the air tight seal. The box according to the present invention allows the installer to pop out an air tight fastener hole-covering slug or knockout with his screwdriver or similar other tool manually. No power tools are required to add a fastener to these boxes and mount them to a steel, concrete or wood surface. The present invention requires only seconds for the installer to accomplish installation and get the box mounted. No power drill is needed to drill holes in the box. No power is needed to penetrate the box surface. The present invention saves a tremendous amount of labor and time.

To achieve these and other readily observable objectives, the present invention essentially provides a junction box, which serves as an air impermeable barrier adjacent a box support structure such as a rafter or stud. The junction box comprises a base plate and a peripheral wall extending therefrom. The base plate and/or wall may comprise a fastener knockout sized and shaped such that when knocked-out, a fastener of comparable transverse dimension may be received in the otherwise exposed fastener-receiving apertures.

The fastener knockouts are preferably preformed in the base plate so as to provide an air impermeable barrier before removal. The fastener knockout(s) are selectively removable for exposing fastener-receiving aperture(s), which further function to receive fasteners outfitted with fastener heads. The fasteners with fastener heads seal the fastener-receiving apertures when fastening the junction box to the box support structure thereby providing an air impermeable barrier adjacent the box support structure.

Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief description of patent drawings.

DETAILED DESCRIPTION OF THE PREFERRED EMBODIMENT

Figure 1:
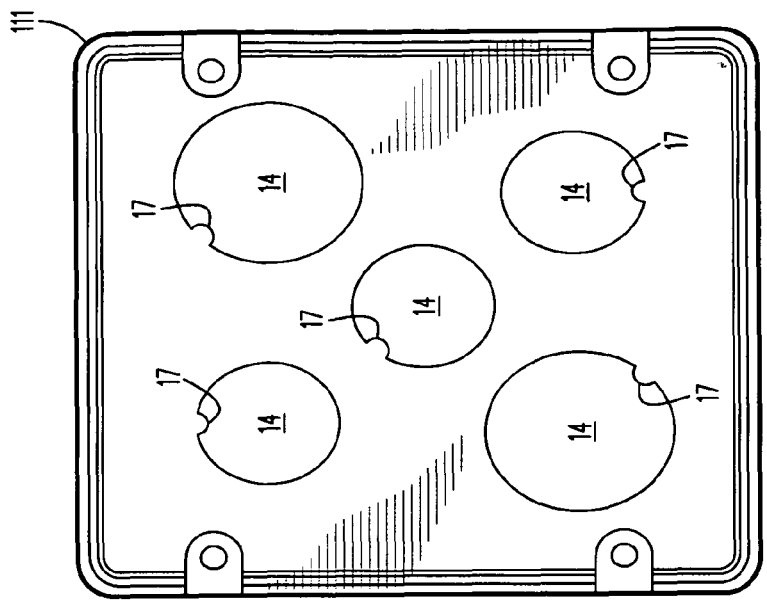
FIG. 1 is a front plan type depiction of a first embodiment of a plenum type electrical junction box according to the present invention showing a base plate having a series of conduit knockouts and a series of fastener knockouts preformed therein.

Referring now to the drawings, the preferred embodiment of the present invention concerns a so-called Chicago style plenum type electrical junction box 10 for providing an air impermeable barrier between a box support structure 20 (such as a rafters, studs, or similar other supporting members) and the junction enclosure defined by the base plate and peripheral wall extending therefrom. The box 10 may be used in combination with one or more fasteners 11, which fasteners 11 function to attach the box 10 to the box support structure 20.

Figure 4:
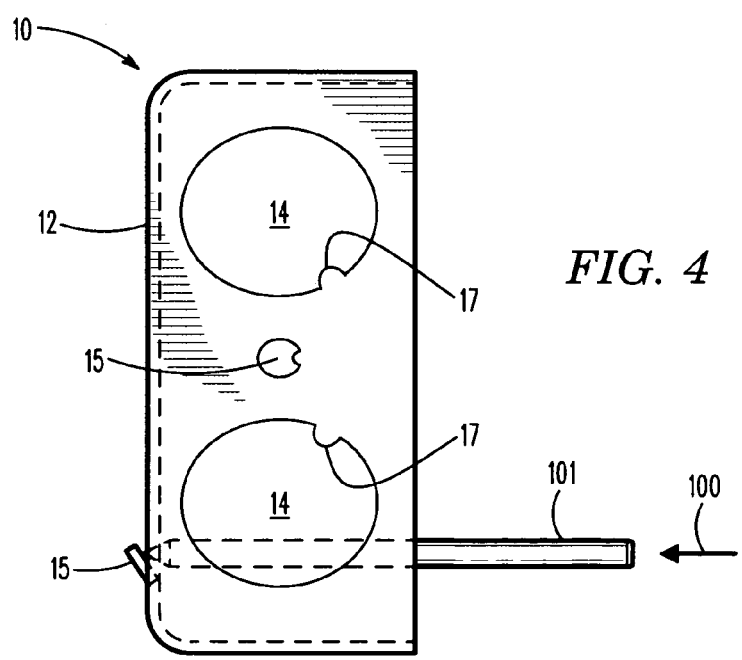
FIG. 4 is a side view of the plenum type electrical junction box according to the present invention showing an implement removing a single fastener knockout from the base plate.

The junction box 10 may be constructed from any suitable material, such as steel, and essentially comprises a base plate 12 and a peripheral wall 13. As earlier stated, the peripheral wall 13 extends from the base plate 12 such that the base plate 12 and peripheral wall 13 define the junction enclosure. In other words, the space bound by the peripheral wall 13 and the base plate 12 may be said to represent the junction enclosure. The base plate 12 is preferably provided with a series of conduit knockouts 14 and a series of fastener knockouts 15. The peripheral wall 13 may also be provided with a series of conduit knockouts 14 and at least one fastener knockout 15 as generally depicted in FIG. 4.

Figure 2:
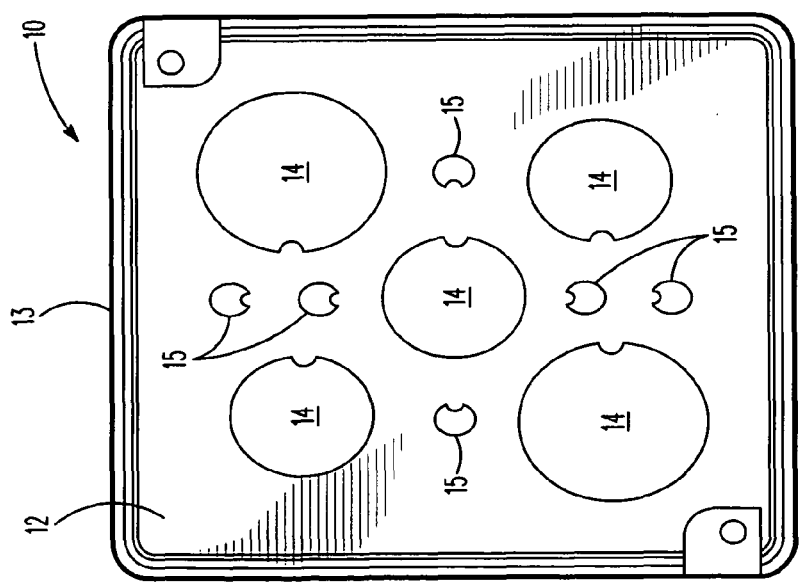
FIG. 2 is a front plan type depiction of a state of the art plenum type electrical junction box showing a base plate having a series of conduit knockouts preformed therein.
Figure 3:
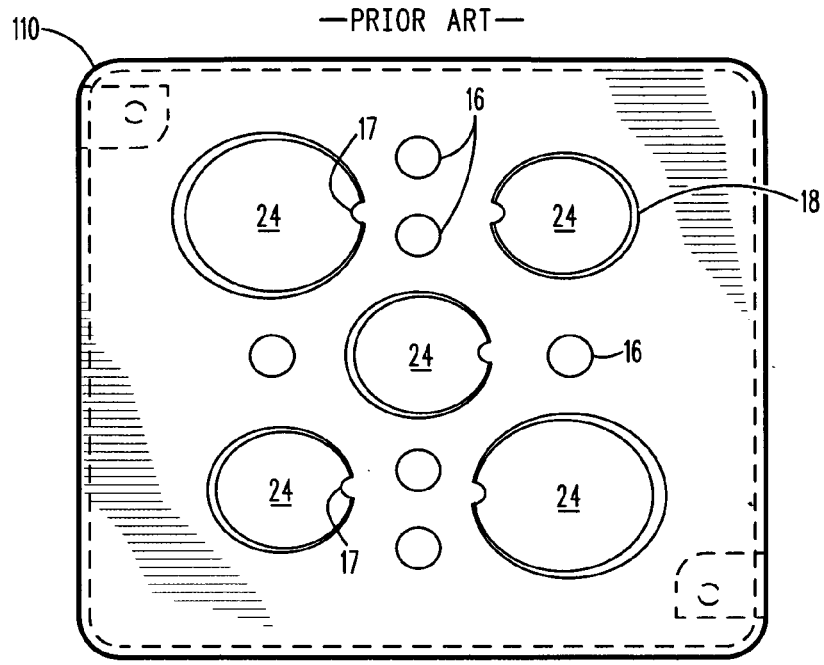
FIG. 3 is a back plan type depiction of a state of the art non-plenum type electrical junction box showing a base plate having a series of conduit knockouts and a series of ever-open fastener-receiving apertures.

From a comparative inspection of FIG. 1 versus FIGS. 2 and 3, it may be seen that the primary distinction between the present invention and the prior art is that the state of the art junction boxes either (1) do not provide fastener apertures (as is the case with traditional Chicago-style plenum type boxes generally depicted in FIG. 2) or (2) provide a series of ever-open fastener-receiving apertures 16 (as is the case with standard electrical junction boxes generally depicted in FIG. 3). In the former case scenario, a drill or similar other device must be used to form fastener-receiving apertures in the base plate 12 or wall 13. This is a time-consuming and thus costly procedure. Further, on-site technicians must carry extra hole-forming equipment. In the latter case of ever-open apertures 16, the barrier structure (defined by the base plate 12 or wall 13) is air permeable—an undesirable structural feature when plenum type junction boxes are required.

It will be recalled that in a standard, non-plenum type electrical conduit or junction box 10, the trade size knockouts 24 are typically cut into the steel side and bottom walls and pushed out being secured to the box body by only a small tab as at 17 that connects the knockout 24 to the box. Typically there is a ⅛"-¼" gap 18 around all knockouts 24 in a standard electrical conduit box as generally depicted in FIG. 3.

In addition to the conduit knockouts 24 in the side and bottom of the standard electrical conduit box 110, these boxes are often further provided with fastener-receiving apertures 16 in the bottom (and possibly sides (not specifically illustrated)) of the box 110 so the installer can insert a screw or nail through the fastener-receiving apertures 16 and mount the box 110 to a wood, concrete or steel surface via the fastener.

So-called Chicago style plenum air tight electrical boxes 111 are similar to the standard version electrical conduit box 110, but the knockouts 14 must be re-hit with the surface body of the box 110 to create an air tight seal. It is also imperative that there are no various sized apertures in box 111 or box 111 would lose its air impermeable quality. Box 111 cannot contain any apertures 16 or other gaps (such as gaps 18) that are common in standard electrical conduit boxes. Chicago plenum boxes have been made without mounting holes or fastener receiving apertures 16 for more than 50 years by various manufacturers. These plenum style boxes are a huge inconvenience to the installer because the installers are typically forced to take out a power drill and drill mounting holes where they need them. This is very time consuming, power consuming, and costly to the installer The box 10 according to the present invention provides a Chicago-style plenum electrical box with air impermeable fastener-receiving apertures covered by slugs or knockouts 15 that are re-hit with the steel surface of the box to create the air impermeable seal. The present invention or box 10 allows the installer to pop out (as at 100) an air impermeable fastener-receiving aperture slug or knockout 15 with his screwdriver or similar other implement (as at 101) manually. As earlier stated, no power tools are required to add a fastener 11 to the boxes 10 and mount them to a steel, concrete or wood support structure 20. The box 10 according to the present invention takes only seconds for the installer to install.

Figure 5:
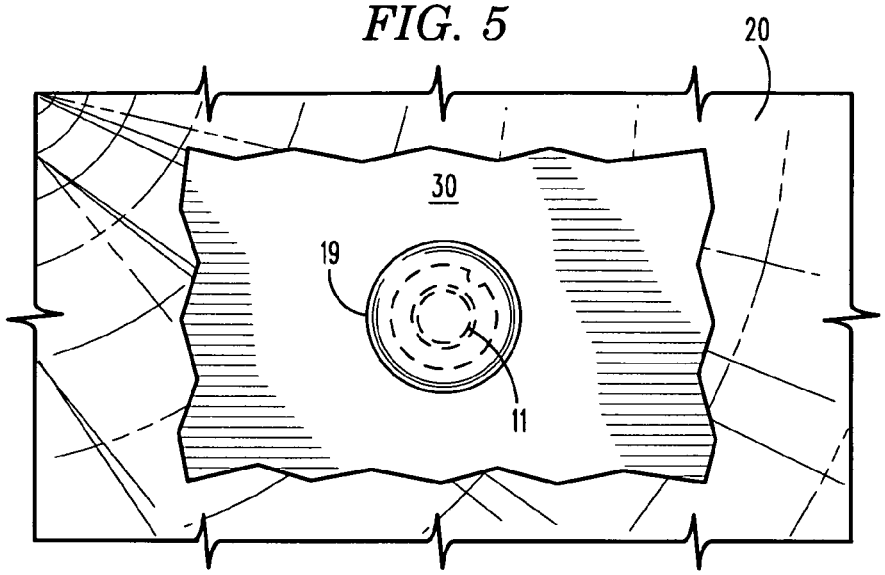
FIG. 5 is a fragmentary front view of a portion of the base plate fastened to a plate support structure via a fastener, the fastener having been inserted through a fastener-receiving aperture uncovered by a removed fastener knockout.
Figure 6:
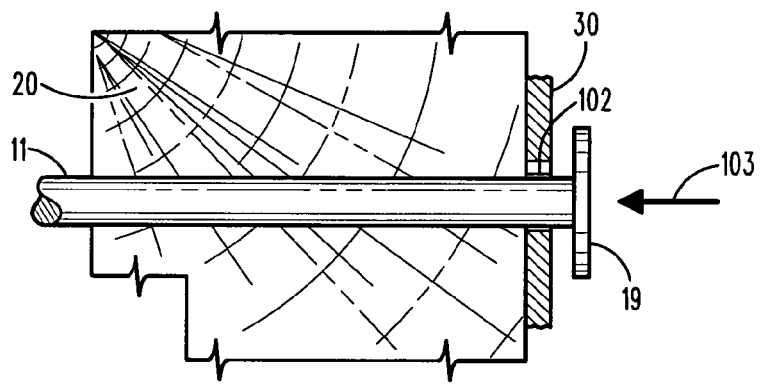
FIG. 6 is a fragmentary sectional type depiction through the plate support structure otherwise depicted in FIG. 5 showing a fastener in the process of fastening the base plate to the plate support structure.
Figure 7:
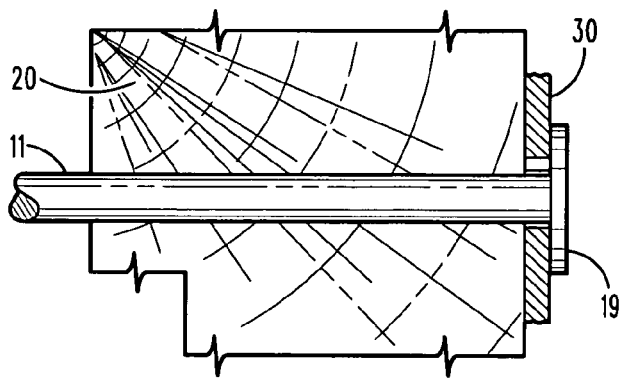
FIG. 7 is a fragmentary sectional type depiction through the plate support structure otherwise depicted in FIG. 5 showing a fastener fully fastening the base plate to the plate support structure and sealing the fastener-receiving aperture via the fastener head.

The fastener knockouts 15 are thus preformed in the base plate 12 so as to provide an air impermeable barrier. The fastener knockouts 15 are selectively removable via some implement 101 for exposing a fastener-receiving aperture 102. As may be gleaned from a comparative inspection of FIGS. 5-7, the fastener-receiving aperture(s) 102 function to receive the fastener(s) 11. The fastener head 19 of the fastener 11 seals the fastener-receiving aperture 102 when fastening (as at 103) the junction box 10 to the box support structure 20 thereby providing an air impermeable barrier between the box support structure 20 and the junction enclosure.

It is contemplated that the box 10 according to the present invention further supports certain novel methodology for installing an electrical junction box, which installation provides an air impermeable barrier adjacent a box support structure 20. In this regard, it is contemplated that said method may preferably comprise the steps of forming a fastener knockout 15 in a junction box base plate 12 such that the fastener knockout 12 provides an air impermeable barrier. Once the fastener knockout 15 is formed, the fastener knockout 15 may be removed from the junction box base plate 12 thereby exposing a fastener-receiving aperture 102.

The junction box base plate 12 may then be positioned adjacent the box support structure 20, and a fastener may be inserted into the fastener-receiving aperture. The installer may then fasten the junction box base plate 12 to the box support structure via the fastener 11. The action of tightening the fastener 11 against the plate 12 seals the fastener-receiving aperture 102 and thereby provides an air impermeable barrier adjacent the box support structure 20.

While the above description contains much specificity, this specificity should not be construed as limitations on the scope of the invention, but rather as an exemplification of the invention. For example, it is contemplated that the present invention essentially describes and teaches a junction box for providing an air impermeable barrier adjacent a box support structure, which junction box comprises a barrier structure as at 30 (which barrier structure 30 is referenced in FIGS. 6 and 7 and may be defined by either the base plate 12 or the peripheral wall 13) having at least one fastener knockout or slug 15 preformed therein. The fastener knockouts or slugs 15 are preformed in the barrier structure so as to provide an air impermeable barrier.

In this last regard, it should be noted that the knockouts or slugs 15 cover a series of fastener-receiving apertures as otherwise referenced at 16. Fastener-receiving apertures 16 are state of the art practice as noted in FIG. 3. The central feature of the present invention is to provide one or more fastener-based, aperture-covering slug(s) as at 15, which slugs 15 are attached to the base plate 12, peripheral wall 13 (or generic barrier structure 30) adjacent fastener-receiving apertures 16 for covering the same and thus providing an air impermeable barrier.

The fastener-based, aperture-covering knockouts or slugs 15 are selectively detachable from the base plate 12, peripheral wall 13 (or generic barrier structure 30) via an implement as at 101 for selectively exposing one or more fastener-receiving apertures. The selectively exposed fastener-receiving apertures function to receive a fastener 11, the head 19 of which re-seals the selectively exposed fastener-receiving aperture 16 when fastening the junction box 10 to the box support structure 20 thereby providing an air tight barrier between the box support structure and the junction enclosure.

As noted, the junction box 10 may comprise a peripheral wall 13 which extends from the base plate 12 such that the base plate 12 and peripheral wall 13 define a junction enclosure. The peripheral wall 13 may comprise a series of conduit knockouts or conduit-based, aperture-covering slugs 14. In addition to the fastener knockouts or fastener based, aperture-covering slugs 15, the junction box 10 may comprises a series of conduit knockouts or conduit-based, aperture-covering slugs, each conduit knockout being preformed in the base plate 12 or peripheral wall 13 so as to also provide an air impermeable barrier.

Further, the method may be said to essentially set forth a method for installing a base plate 12, peripheral wall 13 (or generic barrier structure 30) to a plate support structure (such as box support structure 20) so as to provide an air impermeable barrier adjacent the plate support structure. The method essentially comprises the steps of: removing a preformed fastener knockout or fastener-based, aperture-covering slug 15 from an air impermeable base plate 12 (or generic barrier structure 30) thereby exposing a fastener-receiving aperture as at 16; positioning the base plate 12 (or generic barrier structure 30) adjacent the plate support structure 20; inserting a fastener 11 into the fastener-receiving aperture 16; fastening the base plate 12 (or generic barrier structure 30) to the plate support structure 20 via the fastener 11 and re-sealing the fastener-receiving aperture 16 via the fastener 11 thereby providing an air impermeable barrier adjacent the plate support structure 20.

Accordingly, although the invention has been described by reference to a preferred embodiment and certain installation methodology, it is not intended that the novel box and method of installation be limited thereby, but that modifications thereof are intended to be included as falling within the broad scope and spirit of the foregoing disclosure and the appended drawings.

I claim:

1. A junction box assembly for providing an air impermeable barrier between a box support structure and a junction enclosure, the junction box assembly comprising, in combination: at least one fastener and an electrical junction box, said fastener having a fastener head, the junction box comprising a base plate and a peripheral wall, the peripheral wall extending from the base plate such that the base plate and peripheral wall define the junction enclosure, the base plate comprising a series of fastener-receiving apertures and a series of fastener-based aperture-covering slugs, the fastener-based aperture-covering slugs being attached to the base plate adjacent the fastener-receiving apertures thereby covering the fastener-receiving apertures and providing said air impermeable barrier, the fastener-based aperture-covering slugs being selectively detachable from the base plate via an implement for selectively exposing the series of fastener-receiving apertures, the selectively exposed fastener-receiving apertures for receiving said fastener, said fastener head for re-sealing the selectively exposed fastener-receiving apertures when fastening the junction box to the box support structure thereby providing said air impermeable barrier between the box support structure and the junction enclosure.

2. The electrical junction box of claim 1 wherein the base plate comprises a series of conduit-based aperture-covering slugs, each of said conduit-based aperture-covering slugs being preformed in the base plate so as to provide said air impermeable barrier.

3. The electrical junction box of claim 1 comprising a series of fasteners, a series of fastener heads for re-sealing the fastener receiving apertures when fastening the junction box to the box support structure thereby providing said air impermeable barrier between the box support structure and the junction enclosure.

4. The electrical junction box of claim 1 wherein the peripheral wall comprises a series of conduit-based aperture-covering slugs.

5. A junction box, the junction box for providing an air impermeable barrier adjacent a box support structure, the junction box comprising: a barrier structure, the barrier structure being selected from the group consisting of a base plate and a peripheral wall, the barrier structure comprising a fastener-receiving aperture and a fastener-based aperture-covering slug, the fastener-based aperture-covering slug being attached to the barrier structure adjacent the fastener-receiving aperture thereby covering the fastener-receiving aperture and providing said air impermeable barrier, the fastener-based aperture-covering slug being selectively detachable from the barrier structure via an implement for selectively exposing the fastener-receiving aperture, the selectively exposed fastener-receiving aperture for receiving a fastener having a fastener head, the fastener with fastener head for re-sealing the selectively exposed fastener-receiving aperture when fastening the junction box to the box support structure thereby providing said air impermeable barrier adjacent the box support structure.

6. The junction box of claim 5 wherein the peripheral wall extends from the base plate such that the base plate and peripheral wall define a junction enclosure, the base plate and the peripheral wall comprising at least one conduit-based aperture-covering slug.

7. The junction box of claim 5 wherein the barrier structure comprises a series of conduit-based aperture-covering slugs, each of said conduit-based aperture-covering slugs being preformed in the barrier structure so as to provide said air impermeable barrier.

8. The junction box of claim 5 comprising a series of fastener receiving apertures and a series of fastener based aperture-covering slugs, the fastener-based aperture-covering slugs being preformed in the barrier structure so as to provide said air impermeable barrier, the fastener-based aperture-covering slugs being attached to the barrier structure adjacent the fastener-receiving apertures thereby covering the fastener-receiving apertures, the fastener-based aperture-covering slugs being selectively detachable from the barrier structure via an implement for selectively exposing the series of fastener-receiving aperture, a series of fastener heads being operable to re-seal the fastener-receiving apertures when fastening the junction box to the box support structure thereby providing said air impermeable barrier adjacent the box support structure.

9. A method for installing an electrical junction box so as to provide an air impermeable barrier adjacent a box support structure, the method comprising the steps of: forming a fastener-based aperture-covering slug in a junction box base plate such that the fastener-based aperture-covering slug provides said air impermeable barrier; detaching the fastener-based aperture-covering slug from the junction box base plate via an implement thereby exposing a fastener-receiving aperture; positioning the junction box base plate adjacent the box support structure; inserting a fastener into the fastener-receiving aperture; fastening the junction box base plate to the box support structure via the fastener; and re-sealing the fastener-receiving aperture via the fastener thereby providing said air impermeable barrier adjacent the box support structure.

10. The method of claim 9 wherein a series of fastener-based aperture-covering slugs are formed in the junction box base plate before the step of detaching the fastener-based aperture-covering slugs from the junction box base plate.

11. The method of claim 10 wherein said series of fastener-based aperture-covering slugs are detached from the junction box base plate before positioning the junction box base plate adjacent the box support structure.

12. The method of claim 11 wherein a series of fasteners are inserted into the fastener-receiving apertures in order to fasten the junction box base plate to the box support structure.

13. The method of claim 12 wherein each fastener re-seals respective fastener-receiving aperture for providing said air impermeable barrier adjacent the box support structure.

14. A method for installing a barrier structure upon a support structure so as to provide an air impermeable barrier adjacent the support structure, the method comprising the steps of: removing a preformed, fastener-based aperture-covering slug from said air impermeable barrier structure thereby exposing a fastener-receiving aperture; positioning the barrier structure adjacent the support structure; inserting a fastener into the fastener-receiving aperture; fastening the barrier structure to the support structure via the fastener; and re-sealing the fastener-receiving aperture via the fastener thereby providing said air impermeable barrier adjacent the support structure.

15. The method of claim 14 wherein a series of fastener-based aperture-coveting slugs are preformed in the barrier structure.

16. The method of claim 15 comprising the step of removing said series of fastener-based aperture-covering slugs from the barrier structure before positioning the barrier structure adjacent the support structure.

17. The method of claim 16 comprising the step of inserting a series of fasteners into the fastener receiving apertures in order to fasten the barrier structure to the support structure.

18. The method of claim 17 wherein each fastener re-seals respective fastener-receiving aperture for providing said air impermeable barrier adjacent the support structure.

* * * * *